United States Patent [19]

Shimizu et al.

[11] Patent Number: 5,302,639

[45] Date of Patent: Apr. 12, 1994

[54] POLYMER SCALE PREVENTIVE AGENT

[75] Inventors: Toshihide Shimizu, Urayasu; Minoru Shigemitsu, Kashima, both of Japan

[73] Assignee: Shin-Etsu Chemical Co., Ltd., Tokyo, Japan

[21] Appl. No.: 963,511

[22] Filed: Oct. 20, 1992

Related U.S. Application Data

[63] Continuation-in-part of Ser. No. 780,281, Oct. 22, 1991, abandoned.

[30] Foreign Application Priority Data

Oct. 23, 1990 [JP] Japan .................. 2-284559

[51] Int. Cl.$^5$ .................. C08K 5/34; C08K 39/06
[52] U.S. Cl. .................. 524/86; 524/157; 524/287; 524/548; 252/180
[58] Field of Search .................. 526/62; 252/180; 524/86, 157, 287, 548

[56] References Cited

U.S. PATENT DOCUMENTS

| | | | |
|---|---|---|---|
| 3,876,596 | 4/1975 | Grubert et al. | 524/460 |
| 4,396,734 | 8/1983 | Williams et al. | 524/89 |
| 5,034,477 | 7/1991 | Shimizu et al. | 252/180 |
| 5,084,105 | 1/1992 | Morris et al. | 252/180 |

FOREIGN PATENT DOCUMENTS 0000166 of 1979 European Pat. Off. .

Primary Examiner—Joseph L. Schofer
Assistant Examiner—Tom Weber
Attorney, Agent, or Firm—Nixon & Vanderhye

[57] ABSTRACT

A polymer scale preventive agent for use in polymerization of a monomer having an ethylenic double bond, comprising (A) a nitrogen-containing organic compound having at least five continuous conjugated $\pi$ bonds, (B) an anionic organic compound having at least one group selected from the group consisting of the sulfonic acid group and the carboxylic group and having at least five continuous conjugated $\pi$ bonds, and (C) a vinylpyrrolidone-based polymer. The agent is used for forming a coating on the inner wall, etc. of a polymerization vessel. Deposition of polymer scale can be effectively prevented not only in the liquid phase area but also in the vicinity of the interface between the gas and liquid phases. Products formed from polymer obtained have very few fish eyes.

10 Claims, No Drawings

POLYMER SCALE PREVENTIVE AGENT

This is a continuation-in-part of application Ser. No. 07/780,281, filed Oct. 22, 1991, now abandoned.

BACKGROUND OF THE INVENTION

1. Field of the Invention

The present invention relates to a polymer scale preventive agent in polymerization of a monomer having an ethylenic double bond, a polymerization vessel for preventing polymer scale deposition, and a process of producing polymer using said vessel.

2. Description of the Prior Art

In processes of preparing polymers by polymerizing a monomer in a polymerization vessel, the problem that polymer deposits on the inner wall surface and so forth in the form of scale, is known. The deposition of the polymer scale on the inner wall results in disadvantages that the yield of the polymer and cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer and operators may be exposed thereto, which may cause physical disorders in the operators.

Heretofore, as methods for preventing polymer scale deposition on the inner wall surface and so forth of a polymerization vessel in polymerization of a monomer having an ethylenic double bond, methods in which substances exemplified below are coated on the inner wall surface, etc. as a scale preventive agent, have been known.

For example, particular polar organic compounds (Japanese Patent Publication (KOKOKU) No.45-30343(1970)), a dye or pigment (Japanese Patent Publication (KOKOKU) Nos.45-30835(1970) and 52-24953(1977)), an aromatic amine compound (Japanese Pre-examination Patent Publication (KOKAI) No.51-50887(1976)), a reaction product of a phenolic compound and an aromatic aldehyde (Japanese Pre-examination Patent Publication (KOKAI) No.55-54317(1980)) and an electron-donating compound and/or an electron-accepting compound (Japanese Patent Publication (KOKOKU) No. 53-46235(1978) are disclosed.

According to the methods using these substances, one operation of forming a coating on the inner wall of a polymerization vessel enables repetition of a number of polymerization runs without formation of scale deposition in the area of the liquid phase inside the polymerization vessel.

However, since scale deposition is generally liable to occur in the vicinity of the interface between the gas phase and liquid phase, which is located at an upper section in a polymerization vessel, scale deposition may takes place on this area if a coating of the conventional polymer scale preventive agent mentioned above is formed. Once scale is deposited in the vicinity of the interface between the gas and liquid phases, the deposited scale will grow as polymerization runs are repeated, causing increase in fish eyes, one of properties to be reduced from viewpoint of quality, of formed products.

That is, if polymer scale depositing on the vicinity of the interface between the gas and liquid phases has grown, it may be peeled and incorporated into a polymeric product. When the polymeric product containing the peeled scale is processed into formed products such as sheets or the like, the peeled scale causes many fish eyes in the formed products, lowering the quality thereof seriously.

SUMMARY OF THE INVENTION

An object of the present invention is to provide a polymer scale preventive agent which is capable of preventing polymer scale deposition effectively not only in the area of liquid phase but also in the vicinity of the interface between the gas and liquid phases, and producing a polymeric product of high quality and therefore reducing fish eyes in formed products to a markedly low level, a polymerization vessel capable of preventing polymer scale deposition using the same preventive agent, and a process of producing a polymer using the polymerization vessel.

Thus, the present invention provides, as a means of attaining said object, a polymer scale preventive agent for use in polymerization of a monomer having an ethylenic double bond, comprising:

(A) a nitrogen-containing organic compound having at least five continuous conjugated $\pi$ bonds, (B) an anionic organic compound having at least one group selected from the group consisting of the sulfonic acid group and the carboxyl group and having at least five continuous conjugated $\pi$ bonds, and (C) a vinylpyrrolidone-based polymer.

Further the present invention provides a polymerization vessel having on its inner wall surfaces a coating comprising said components (A), (B) and (C).

Furthermore, the present invention provides a process of producing a polymer by polymerization of a monomer having an ethylenic double bond in a polymerization vessel, comprising the step of carrying out said polymerization in said polymerization vessel having the coating on the inner wall surfaces, whereby the deposition of polymer scale is prevented.

According to the present invention, deposition of polymer scale can be effectively prevented not only in the liquid phase area but also in the vicinity of the interface between the gas and liquid phases. In addition, the coating formed on the inner wall surfaces according to the present invention is hardly peeled or dissolved into a polymerization mass during polymerization; hence products formed from the resulting polymeric product have very few fish eyes.

Further, according to the present invention, polymer scale deposition can be effectively prevented, irrespectively of polymerization conditions such as the kind of a monomer or a polymerization initiator, polymerization type, the kind of material constituting the inner wall of polymerization vessels, etc. That is, deposition of polymer scale can be effectively prevented in polymerizations in which polymer scale deposition has been difficult to prevent, e.g., in emulsion polymerization, polymerizations using a polymerization vessel made of stainless steel, or polymerizations using a polymerization initiator with a strong oxidizing action such as potassium peroxodisulfate and the like.

Therefore, if polymerization is carried out under application of the present invention, the operation of removing polymer scale is not necessarily conducted every polymerization run, thereby productivity being improved.

DETAILED DESCRIPTION OF PREFERRED EMBODIMENTS

Polymer Scale Preventive Agent

(A) Nitrogen-Containing Organic Compound

The nitrogen-containing organic compound, component (A) of the polymer scale preventive agent of the present invention, needs to have at least five continuous conjugated $\pi$ bonds. Preferably, the nitrogen-containing organic compound has neither a sulfonic acid group nor a carboxyl group.

The nitrogen-containing organic compounds include, for example, nitrogen-containing benzene derivatives such as benzidine, 4-aminobiphenyl, 2,2'-diaminodiphenylacetylene, and Disperse Yellow 9 [i.e., N-(2,4-dinitrophenyl)-1,4-phenylenediamine]; nitrogen-containing naphthalene derivatives such as α-naphthylamine, β-naphthylamine, 1,8-diaminonaphthalene, 1,5-diaminonaphthalene, etc.; nitrogen-containing polynuclear aromatic compounds such as 1-aminoanthracene, 1,4-diaminoanthracene, 9,10-diaminoanthracene, 1,6-diaminopyrene, etc.; nitrogen-containing quinones such as 2-aminoanthraquinone, 1,4-diaminoanthraquinone, 3,6-diamonophenanthrenequinone, etc.; nitrogen-containing heterocyclic compounds such as quinoline, 4-aminoacridine, 3,6-diaminoacridine, thionine, indophenol, methylviologen, 1,10-phenanthroline, phenothiazine, Methylene Blue, 2-aminofluorene, 9-aminofluorene, carbazole, methylcarbazole, 2,3-diaminophenazine, acriflavine, indigo, Safranine [C.I. No. 50240], Acridine Orange [C.I. No. 46005], Solvent Black 5 [C.I.No. 50415], etc.; alkaloids such as berberine; nitrogen-containing azo compounds such as azobenzene, p-hydroxyazobenzenes, p-aminoazobenzenes, 1,3-diphenyltriazene, 1-(phenylazo)-2-naphthalenol, Sudan I [i.e., C.I. Solvent Yellow 14], Sudan II [i.e., C.I. Solvent Orange 7], Sudan III [i.e., C.I. Solvent Red 23], Sudan IV [C.I. Solvent Red 24], Sudan Black B [C.I. Solvent Black 3], Oil Red O [i.e., C.I. Solvent Red 27], Disperse Orange 1 [i.e., 4-(4-nitrophenylazo) diphenylamine], Naphthyl Red (i.e., 4-phenylazo-1-naphthylamine], chrysoidine [C.I. No. 11270], Solvent Yellow 2 [C.I.No. 11020], Solvent Yellow 6 [C.I. No. 11390], Solvent Orange I [C.I.No. 11920], Solvent Orange 2 [C.I. No. 12100], Solvent Orange 14 (C.I. No.20620], Solvent Red 1 [C.I.No.12150], Solvent Red 3 [C.I. No.120101, Solvent Brown 3 [C.I. No. 11360], etc. These may be used singly or in combination of two or more. Among the compounds above, particularly preferred are the nitrogen-containing naphthalene derivatives, nitrogen-containing heterocyclic compounds and nitrogen-containing azo compounds.

(B) Anionic Organic Compound

The anionic organic compound, component (B) of the polymer scale preventive agent of the present invention, has at least one group out of the sulfonic acid group and carboxyl group and has at least 5 continuous conjugated $\pi$ bonds.

Such anionic organic compounds include, for example, anionic benzene derivatives such as erythrosine [C.I. No. 45430], phloxine [C.I. No. 45410], Rose Bengal [C.I. No. 45440], Acid Red [C.I. No. 45100], Briliant Blue FCF [No. 42090], Fast Green FCF [C.I. No. 42053], etc.; anionic naphthalene derivatives such as sodium 1-naphthalenesulfonate, 3-hydroxy-2-naphthoic acid, 6,6'-oxybis(2-naphthalenesufonic acid), sodium 6-hydroxy-2-naphthalenesulfonate, etc.; anionic polynuclear aromatic compounds such as 9-anthracenecarboxylic acid, 1-pyrenebutylic acid, etc.; anionic quinones such as sodium anthraquinone-β-sulfonate, sodium anthraquinone-2,6-disulfonate, Alizarine Red S [C.I. No. 58005], Alizarine Blue Black B [Mordant Black B], Alizarine Violet 3R [i.e., C.I. Acid Violet 34], etc.; anionic heterocyclic compounds such as Indigo Carmine [C.I. No. 73015], Acid Black 2, gallocyanine, etc.; anionic azo compounds such as sodium 4,4'-(1-triazene-1,3-diyl)-bis(benzenesulfonate), sodium 6-hydroxy-5-(phenylazo)-2-naphthalenesulfonate, sodium 4-[(2-hydroxy-1-naphthalene)azo]benzenesulfonate, sodium 3-hydroxy-4-[(4-sufophenyl)azo]-2,7-naphthalenesulfonate, Amaranth [C.I. No. 16185], New Coccine [i.e., C.I. No. 16255], Tartrazine [C.I. No. 19140], Tropaeoline O [i.e., C.I. Acid Orange 6], Orange I [Tropaeoline OOO No.1; C.I. No. 14600], Ponceau SS [C.I. Acid Red 150], Metanil Yellow [i.e., C.I. Acid Yellow 36], C.I. Acid Blue 161, C.I. Acid Red 88, Alizarine Yellow R, C.I. Mordant Orange 10, C.I. Mordant Yellow 10, etc. These may be used singly or in combination of two or more.

Among the compounds above, preferred are the anionic heterocyclic compounds and anionic azo compounds.

(C) Vinylpyrrolidone-Based Polymer

The vinylpyrrolidone-based polymer, component (C) of the present polymer scale preventive agent, includes polyvinylpyrrolidones, homopolymers of vinylpyrrolidone, and copolymers of vinylpyrrolidone with other comonomers. The comonomers copolymerizable with vinylpyrrolidone include, for example, acrylic acid, methacrylic acid, methyl methacrylate, vinyl acetate and the like. These may be used singly or in combination of two or more. The amount of the comonomer in the polymer ranges normally from 1 to 50% by weight, preferably 5 to 30% by weight.

The vinylpyrrolidone-based polymers can be used singly or in combination of two or more.

Among the polymers, preferred are polyvinylpyrrolidones, vinylpyrrolidone-acrylic acid copolymers and vinylpyrrolidone-vinyl acetate copolymers with a molecular weight of 2,000 to 2,000,000, preferably 10,000 to 1,000,000. If the molecular weight of the polymer is too small, the scale preventing effect is disadvantageously lowered; if the molecular weight is too large, a coating liquid described later has a high viscosity, causing disadvantages such as making the coating operation difficult.

The polymer scale preventive agent of the present invention is used for preventing polymer scale deposition on the inner wall surfaces, etc. of a polymerization vessel, for example, by being used for forming a coating thereon.

According to the present invention, the use of the vinylpyrrolidone-based polymer (C) in combination with the nitrogen-containing organic compound (A) and the anionic organic compound (B) provides a marked scale preventing effect. The mechanism of the action due to the vinylpyrrolidone-based polymer is not clear. Presumably, the action is caused because the vinylpyrrolidone-based polymer (C) affects both of the nitrogen-containing organic compound (A) and the anionic organic compound (B), thereby increasing hydrophilic nature.

The amount of the vinylpyrrolidone-based polymer (C) in the polymer scale preventive agent of the present invention ranges normally from 0.1 to 1,000 parts by weight, preferably 1 to 600 parts by weight, more preferably 10 to 200 parts by weight, per 100 parts by weight of the total amount of the nitrogen-containing organic compound (A) and the anionic organic compound (B). If the amount of the vinylpyrrolidone-based polymer is too small or too large, improvement in scale preventing effect due to the combined use of the component (C) with the components (A) and (B) is lowered.

The amount of component (B) is normally in the range of 0.1 to 1,000 parts by weight, preferably 5 to 400 parts by weight, per 100 parts by weight of the component (A). If the amount of component (B) is outside the range above, the scale preventing effect may be lowered.

The polymer scale preventive agent is used for forming a coating on the inner wall surfaces, and preferably the surfaces of parts with which monomer comes into contact during polymerization, e.g., a stirring shaft, stirring blades, baffles, condensing coils, etc. of a polymerization vessel, so that scale deposition in the vessel can be prevented. Normally, in forming said coating on the inner wall surfaces, etc. of a polymerization, the polymer scale preventive agent is used in a liquid state, i.e., as a coating liquid.

Preparation of a Coating Liquid

The coating liquid menthioned above is prepared by dissolving or dispersing said components (A), (B) and (C) in a solvent.

The solvents used for preparation of the coating solution include, for example, water; alcohols such as methanol, ethanol, propanol, butanol, 2-butanol, 2-methyl-1-propanol, 2-methyl-2-propanol, 3-methyl-1-butanol, 2-methyl-2-butanol, 2-pentanol, etc.; ketones such as acetone, methyl ethyl ketone, methyl isobutyl ketone, etc.; esters such as methyl formate, ethyl formate, methyl acetate, methyl acetoacetate, etc.; ethers such as 4-methyldioxolane, ethylene glycol diethyl ether, etc.; furans; and aprotic solvents such as dimethylformamide, dimethyl sulfoxide, acetonitrile, etc. These solvents may be used singly or as a mixed solvent of two or more thereof as appropriate.

Among the solvents above, preferred are organic solvent-based solvents consisting of an organic solvent optionally 0 to 30% by weight of, preferably 0 to 10% by weight of water. Use of such solvents can further improve the scale preventing effect, prevent uneven application in applying the coating liquid to the inner wall surfaces, etc., and shorten the time required in the drying step after the application. Preferred organic solvents include alcohol solvents such as methanol, ethanol, propanol, butanol, 2-butanol, 2-methyl-1-propanol, 2-methyl-2-propanol, 3-methyl-1-butanol, 2-methyl-2-butanol, and 2-pentanol.

The total concentration of components (A), (B) and (C) in the coating liquid is not particularly limited as long as the total coating weight described later is obtained, and normally may range from 0.001 to 15% by weight, preferably from 0.01 to 1% by weight.

The coating liquid containing the components (A), (B) and (C) is stable at a pH of higher than 7, preferably at a pH of 7.5 or higher, so that it can be stored for a long period. Moreover, at a pH of 9.0 or higher, the scale preventing effect is also improved. Therefore, preferably, in preparation of a coating liquid, the components (A), (B) and (C) are added to a solvent, and then the pH thereof is optionally adjusted to the range above quickly when the liquid is not alkaline. The alkaline compounds which may be used to adjust the pH include, e.g., alkali metal compounds such as sodium hydroxide, potassium hydroxide, and sodium carbonate, and organic amines such as ethylenediamine, ethanolamine, triethanolamine, tetramethylenediamine, ethylamine, diethylamine, and the like. Among these compounds, the organic amines are particularly preferred.

In the case where an organic solvent-based solvent is used as the solvent and an organic amine compound is used as the alkaline compound for the present scale preventive agent as described above, the scale preventing effect is further improved. The reason for this is not clear, but presumably some interaction occurring among the components (A), (B) and (C) enhances the scale preventing effect, and the interaction is strengthened where using an organic solvent-based solvent as compared with the case where using an aqueous medium, or where using an organic amine compound as compared with the case using an alkali metal compound.

To the coating liquid, for example, a cationic surfactant, a nonionic surfactant, an anionic surfactant, and so forth can be added as long as the scale preventing effect is not impaired.

Further, inorganic compounds can be added to the coating liquid suitably as long as the scale preventing effect is not impaired. The inorganic compounds which may be added include, for example, silicic acids or silicates such as orthosilicic acid, metasilicic acid, mesodisilicic acid, mesotrisilicic acid, mesotetrasilicic acid, sodium metasilicate, sodium orthosilicate, sodium disilicate, disilicate, sodium tetrasilicate and water glass; metallic salts such as oxygen acid salts, acetates, nitrates, hydroxides or halides of a metal selected from alkali earth metals such as magnesium, calcium, and barium, zinc family metals such as zinc, aluminum family metals such as aluminum, and platinum family metals such as platinum; and inorganic colloids such as ferric hydroxide colloid, colloid of silicic acid, colloid of barium sulfate, and colloid of aluminum hydroxide. The above-mentioned inorganic colloids may be those prepared, for example, by mechanical crushing, irradiation with ultrasonic wave, electrical dispersion or chemical methods.

Formation of Coating

When the coating liquid prepared as described above is used for forming a coating on the inner wall surface of a polymerization vessel, first, the coating liquid is applied to the inner wall surface and then dried sufficiently, followed by washing with water if necessary. A coating is formed by these operations on the inner wall surface of the polymerization vessel; hence the polymer scale deposition thereon can be prevented.

The above-mentioned coating is preferably formed on not only the inner wall surfaces of a polymerization vessel but also other parts with which the monomer comes into contact during polymerization. For example, it is preferred to form the coating by applying said coating liquid on a stirring shaft, stirring blades, condensers, headers, search coil, bolts, nuts, etc.

More preferably, the coating is formed on not only the parts with which the monomer comes into contact during polymerization but also other parts on which polymer scale may deposit, for example, such as the inner surfaces of equipment and tubes of recovery system for unreacted monomer. These parts, more specifically, are exemplified by the inner wall surfaces of monomer distillation columns, condensers, monomer stock tanks and valves, etc. in said recovery system.

The method of applying the coating liquid on the inner wall surface, etc. of a polymerization vessel is not particularly limited, and includes, for example, the brush coating, spray coating, the method of filing the polymerization vessel, etc. with the coating liquid followed by withdrawal thereof, and automatic coating methods as disclosed in Japanese Pre-examination Patent Publication (KOKAI) Nos.57-61001(1982) and 55-36288(1980), and Japanese Patent Publication (KOHYO) Nos.56-501116(1981) and 56-1117(1981), and Japanese Pre-examination Publication (KOKAI) No.59-11303(1984), etc.

The method of drying wet coated surface provided by application of the coating liquid, is not limited, either. The drying is conducted preferably at a temperature within the range from room temperature to 100° C. Specifically, a method in which, after the liquid is applied, hot air with a suitable elevated temperature is blown to the coated surface, and a method in which the inner wall surface of a polymerization vessel and the surfaces of other parts to be coated are previously heated at, e.g., 30°-80° C. and the coating liquid is directly applied to the heated surfaces, etc. After dried, the coated surfaces are washed with water if necessary.

The coating thus formed has normally a coating weight of 0.001 g/m$^2$ or more, preferably from 0.05 to 2 g/m$^2$.

The above coating operation may be conducted every 1 to ten-odd batches of polymerization. The formed coating has fairly good durability and retains the polymer scale-preventing action; therefore the coating operation is not necessarily performed for every batch of polymerization. Hence, the productivity of the manufactured polymer is improved.

Polymerization

After forming the coating on the inner wall surfaces of a polymerization vessel and other parts with which monomer may come into contact by application of the coating liquid, polymerization is carried out in accordance with conventional procedures therein. That is, a monomer having an ethylenic double bond and a polymerization initiator (catalyst) are charged, and then, a Polymerization medium such as water, etc. and, optionally, a dispersing agent such as suspension agents, solid dispersing agents, and nonionic and anionic emulsifying agents, etc. are charged, followed by carrying out polymerization according to conventional methods.

The monomer having an ethylenic double bond to which the method of this invention can be applied includes, for example, vinyl halides such as vinyl chloride; vinyl esters such as vinyl acetate and vinyl propionate; acrylic acid, methacrylic acid, and esters and salts thereof; maleic acid, fumaric acid, and esters and anhydrides thereof; and diene monomers such as butadiene, chloroprene and isoprene; aromatic vinyl compounds such as styrene; as well as acrylonitrile, halogenated vinylidenes, and vinyl ethers.

There are no particular limitations on the type of polymerization to which the method of this invention can be applied. The present invention is effective in any types of polymerization such as suspension polymerization, emulsion polymerization, solution polymerization, bulk polymerization, and gas phase polymerization. Particularly, the present method is suitable to polymerizations in an aqueous medium such as suspension or emulsion polymerization.

Specifically, in the case of suspension polymerization and emulsion polymerization, polymerization is generally performed as follows, for instance.

First, water and a dispersing agent are charged into a polymerization vessel, and thereafter a polymerization initiator is charged. Subsequently, the inside of the polymerization vessel is evacuated to a pressure of from about 0.1 to about 760 mmhg, and a monomer is then charged (whereupon the pressure inside the polymerization vessel usually becomes from 0.5 to 30 kgf/cm$^2$.G). Then, the polymerization is normally carried out at a temperature of from 30° to 150° C. During the polymerization, one or more of water, a dispersing agent and a polymerization initiator may be added, if necessary. Reaction temperature during the polymerization is different depending on the kind of monomer to by polymerized. For example, in the case of polymerizing vinyl chloride, polymerization may be carried out at 30° to 80° C.; in the case of polymerizing styrene, polymerization may be carried out at 50° to 150° C. The polymerization may be judged to be completed when the pressure inside the polymerization vessel falls to from about 0 to 7 kgf/cm$^2$.G or when cooling water which passes through a jacket provided around the polymerization vessel indicates almost the same temperature at the inlet where it is charged and at the outlet where it is discharged (i.e., when liberation of heat due to polymerization reaction has been completed). The water, dispersing agent and polymerization initiator charged for the polymerization are used in amounts of about 20 to 500 parts by weight, about 0.01 to 30 parts by weight, and about 0.01 to 5 parts by weight, respectively, per 100 parts by weight of the monomer.

In the case of solution polymerization, an organic solution such as toluene, xylene, pyridine and the like is used as a polymerization medium in place of water. The dispersing agent is optionally used. The other conditions are generally the same as those described for suspension and emulsion polymerization.

In the case of bulk polymerization, after the inside of a polymerization vessel is evacuated to a pressure of from about 0.01 mmhg to about 760 mmhg, a monomer and a polymerization initiator are charged, and then polymerization is carried out at a temperature of from −10° C. to 250° C. For example, in the case of polymerizing vinyl chloride, polymerization is carried out at a temperature of from 30° C. to 80° C.; and in the case of polymerizing styrene, polymerization may be carried out at 50° C. to 150° C.

The method of the present invention is effective in preventing polymer scale from depositing, independent of materials constituting the inner wall, etc. of a polymerization vessel. For example, this method is effective in preventing polymer scale from depositing in polymerization vessels made of a stainless steel or other steels or vessels lined with glass.

Any additive materials that have been added in a polymerization system can be used without any limitation. More specifically, the method of this invention can effectively prevent polymer scale from depositing, even in polymerization systems containing the following additives: for example, polymerization initiators such as t-butyl peroxyneodecanoate, bis(2-ethylhexyl) peroxydicarbonate, 3,5,5-trimethylhexanoyl peroxide, α- cumyl peroxyneodecanoate, cumene hydroperoxide, cyclohexanone peroxide, t-butyl peroxypivalate, bis(2-ethylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-methane hydroperoxide; suspension agents comprised of natural or synthetic polymeric compounds such as partially saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as trichloroethylene and mercaptans as exemplified by t-dodecyl mercaptans; and pH adjusters.

Addition to Polymerization System

The polymer scale preventive agent of the present invention may be added into a polymerization medium in addition to the formation of the coating, so that the scale preventing effect is further improved. The amount of the polymer scale preventive agent to be added into the polymerization medium, preferably ranges from about 10 ppm to 1,000 ppm based on the whole weight of the monomer charged. The addition should be conducted so that it may not affect the quality of polymeric product to be obtained with respect to fish eyes, bulk density, particle size distribution, etc.

EXAMPLES

The present invention is now described in detail by way of working examples and comparative examples. In each of the tables below, Experiments of Nos. marked with * are comparative examples, and the other Experiments working examples of the present invention.

Example 1

Polymerization was carried out in the following manner using a polymerization vessel with an inner capacity of 1,000 liters and having a stirrer.

In each experiment, first, a component (A) (nitrogen-containing organic compound), a component (B) (anionic organic compound) and a component (C) (polyvinylpyrrolidone, produced by Aldrich Chemical Co., Ltd.) were dissolved in a solvent so that the total concentration thereof might become the value given in Table 1, to prepare a coating liquid. The coating liquid was applied by spraying to the inner wall and other parts with which a monomer comes into contact including the stirring shaft, stirring blades and baffles, followed by drying under heating at 40° C. for 15 min. to form a coating, which was then washed with water.

Experiments of Nos. 101–107 are comparative examples in which no coating liquid was applied or a coating liquid containing only one or two of components (A), (B) and (C) was applied.

The nitrogen-containing organic compound (A), the anionic organic compound (B), the average molecular weight of the vinylpyrrolidone-based polymer (C), the total concentration of the components (A), (B) and (C), the weight ratio of (A)/(B)/(C), and the solvent used in each experiment are given in Table 1.

Subsequently, in the polymerization vessel in which a coating had been formed by the coating operation as above, were charged 400 kg of water, 200 kg of vinyl chloride, 250 g of a partially saponified polyvinyl alcohol, 25 g of hydroxypropylmethyl cellulose and 70 g of 3,5,5-trimethylhexanoyl peroxide. Then, polymerization was carried out at 66° C. with stirring for 6 hours. After the completion of the polymerization, polymeric product and unreacted monomer were taken out of the vessel and then the inside of the vessel was washed with water and residual resin was removed.

Thereafter, the batch of operations from applying a coating liquid through carrying out polymerization to cleaning the vessel with water was repeated. After repetition of 10 batches of polymerization run, the amount of polymer scale depositing on the inner wall was measured at an area in the liquid phase and in the vicinity of the interface between the gas and liquid phases, in accordance with the method below. The results are given in Table 2, provided that for Experiments of Nos. 101 to 107, the results after the second batch were given. In Experiments of Nos. 108 to 114, polymerization runs were repeated for another 10 batches, and the amount of scale after 20 batches in total was also measured.

The polymeric products obtained after 10th batch and 20th batch in each experiment were formed into sheet, and fish eyes on the sheet were measured in accordance with the method below. The results are given in Table 2. —Measurement of the amount of polymer scale The scale depositing on the inner wall surface in the area of 10 cm² were scraped off with a stainless steel spatula as completely as possible to be confirmed with naked eyes, and then the scraped scale was weighted on a balance. Thereafter, the amount of the deposited scale per area of 1 m² was obtained by multiplying the measured value by 100. —Measurement of fish eyes A hundred parts by weight of a polymer, 50 parts by weight of DOP, 1 part by weight of dibutyltin dilaurate, 1 part by weight of cetyl alcohol, 0.25 part by weight of titanium oxide and 0.05 part by weight of carbon black were formulated to prepare a mixture. The mixture was kneaded at 150° C. for 7 min. with a twin roll mill, and then formed into a sheet 0.2 mm thick. The sheet was examined for number of fish eyes per 100 cm² by light transmission.

TABLE 1

| | Coating liquid | | | | | | |
|---|---|---|---|---|---|---|---|
| | (A) Nitrogen-containing | (B) Anionic | (C) Average molecular weight | Total concentration | | Solvent | |
| Exp. No | organic compound | organic compound | of polyvinyl pyrrolidone | of (A) + (B) (wt. %) | Weight ratio (A)/(B)/(C) | Composition (Wt. ratio) | pH (Additive) |
| 101* | — | — | — | — | — | — | — |
| 102* | Sudan Black B | — | — | 0.2 | 100/0/0 | Methanol | 6.8 |

TABLE 1-continued

| Exp. No | (A) Nitrogen-containing organic compound | (B) Anionic organic compound | (C) Average molecular weight of polyvinyl pyrrolidone | Total concentration of (A) + (B) (wt. %) | Weight ratio (A)/(B)/(C) | Solvent Composition (Wt. ratio) | pH (Additive) |
|---|---|---|---|---|---|---|---|
| 103* | — | C.I. Acid Black 2 | — | 0.2 | 0/100/0 | Methanol | 7.7 |
| 104* | — | — | 40,000 | 0.2 | 0/0/100 | Methanol | 7.5 |
| 105* | Sudan Black B | — | 40,000 | 0.2 | 80/0/20 | Methanol | 7.2 |
| 106* | — | C.I. Acid Black 2 | 40,000 | 0.2 | 0/50/50 | Methanol | 7.8 |
| 107* | Sudan Black B | C.I. Acid Black 2 | — | 0.2 | 50/50/0 | Methanol | 7.4 |
| 108 | Sudan Black B | C.I. Acid Black 2 | 40,000 | 0.2 | 40/40/20 | Methanol | 7.5 |
| 109 | Sudan Black B | C.I. Acid Black 2 | 40,000 | 0.2 | 60/30/10 | Methanol | 10.5 (Ethylenediamine) |
| 110 | 1,8-Diaminonaphthalene | C.I. Acid Blue 161 | 10,000 | 0.1 | 35/35/30 | Aceton/Water (50/50) | 11.0 (Ethanolamine) |
| 111 | 3,6-Diaminoacridine | Orange 1 | 360,000 | 0.05 | 20/20/60 | Methanol/Water (50/50) | 10.0 (Ethanolamine) |
| 112 | p-Hydroxyazobenzene | Tartrazine | 40,000 | 0.05 | 40/40/20 | Methanol/Water (30/70) | 10.0 (Ethanolamine) |
| 113 | Sudan III (C.I. Solvent red 23) | Amaranth | 40,000 | 0.05 | 40/50/10 | Methanol/Water (90/10) | 12.0 (Triethanolamine) |
| 114 | C.I. Solvent Brown 3 | Alizarine Red S | 40,000 | 0.05 | 50/40/10 | Methanol/Water (50/50) | 12.0 (Ethylenediamine) |

TABLE 2

| | After 10 polymerization runs[1] | | | After 20 polymerization runs[2] | | |
|---|---|---|---|---|---|---|
| | Amount of scale (g/m²) | | No. of | Amount of scale (g/m²) | | No. of |
| Exp. No | Liquid phase area | Area in vicinity of liquid - gas interface | fish eyes | Liquid phase area | Area in vicinity of liquid - gas interface | fish eyes |
| 101* | 2100 | 4,500 | 53 | — | — | — |
| 102* | 10 | 200 | 25 | — | — | — |
| 103* | 2000 | 4,200 | 50 | — | — | — |
| 104* | 2000 | 4,200 | 49 | — | — | — |
| 105* | 5 | 100 | 29 | — | — | — |
| 106* | 1800 | 4,100 | 47 | — | — | — |
| 107* | 0 | 90 | 18 | — | — | — |
| 108 | 0 | 25 | 13 | 0 | 39 | 15 |
| 109 | 0 | 0 | 1 | 0 | 1 | 2 |
| 110 | 0 | 30 | 9 | 0 | 50 | 15 |
| 111 | 0 | 48 | 16 | 0 | 60 | 22 |
| 112 | 0 | 38 | 17 | 0 | 95 | 25 |
| 113 | 0 | 0 | 1 | 0 | 1 | 2 |
| 114 | 0 | 20 | 12 | 0 | 35 | 17 |

Remarks: The data shown for Exp. Nos. 101-107 were measured after two polymerization runs.

Example 2

In each experiment, the coating procedure of Example 1 was repeated for a stainless steel polymerization vessel having an inner capacity of 20 liters and equipped with a stirrer, except that a coating liquid in which the nitrogen-containing organic compound (A), the anionic organic compound (B), the average molecular weight of the polyvinylpyrrolidone (C) (product by Aldrich Chemical Co., Ltd.), the total concentration of the components (A)+(B)+(C), the weight ratio of (A)/(B)/(C), and the solvent are as given in Table 3, was used. Experiments of Nos. 201 to 207 are comparative experiments in which no coating liquid was applied or a coating liquid containing only one or two of the component (A), (B) and (C) was applied.

In the polymerization vessel in which the coating was thus formed, were charged 9 kg of water, 225 g of sodium dodecylbenzenesulfonate, 12 g of t-dodecyl mercaptan, and 13 g of potassium peroxodisulfate. After the inner atmosphere was replaced with a nitrogen gas, 1.3 kg of styrene and 3.8 kg of butadiene were charged, followed by polymerization at 50° C. for 20 hours.

After completion of the polymerization, the amount of polymer scale depositing on the inner wall surface was measured at an area which had been located in the liquid phase during polymerization and in the vicinity of the interface between the gas and liquid phases.

In Experiments of Nos. 208 to 212, the batch of operations of applying a coating liquid and polymerization above was repeated 10 times. After the 10 batches, the amount of polymer scale depositing on the inner wall surface was measured at an area which had been located in the liquid phase and in the vicinity of the interface between the gas and liquid phases.

The results are given in Table 4.

TABLE 3

| Exp. No | (A) Nitrogen-containing organic compound | (B) Anionic organic compound | (C) Average molecular weight of polyvinyl pyrrolidone | Total concentration of (A) + (B) (wt. %) | Weight ratio (A)/(B)/(C) | Solvent Composition (Wt. ratio) | pH (Additive) |
|---|---|---|---|---|---|---|---|
| 201* | — | — | — | — | — | — | — |
| 202* | C.I. Solvent Brown 3 | — | — | 0.3 | 100/0/0 | Methanol | 6.7 |
| 203* | — | C.I. Acid Black 2 | — | 0.3 | 0/100/0 | Methanol | 7.7 |
| 204* | — | — | 40,000 | 0.3 | 0/0/100 | Methanol | 7.5 |
| 205* | C.I. Solvent-Brown 3 | — | 40,000 | 0.3 | 80/0/20 | Methanol | 7.2 |
| 206* | — | C.I. Acid Black 2 | 40,000 | 0.3 | 0/50/50 | Methanol | 7.8 |
| 207* | C.I. Solvent-Brown 3 | C.I. Acid Black 2 | — | 0.3 | 50/50/0 | Methanol | 7.4 |
| 208 | C.I. Solvent-Brown 3 | C.I. Acid Black 2 | 40,000 | 0.3 | 40/40/20 | Methanol | 7.5 |
| 209 | C.I. Solvent-Brown 3 | C.I. Acid Black 2 | 40,000 | 0.3 | 40/40/20 | Methanol | 10.5 (Ethylenediamine) |
| 210 | 1,8-Diaminonaphthalene | Tropaeoline 0 | 360,000 | 0.1 | 25/25/50 | Methanol/Water (70/30) | 11.0 (Ethanolamine) |
| 211 | p-Hydroxyazobenzene | C.I. Acid Red 150 | 360,000 | 0.1 | 50/40/10 | Methanol/Water (50/50) | 11.0 (Triethanolamine) |
| 212 | C.I. Solvent Red 3 | Alizarine Blue Black 8 | 360,000 | 0.05 | 40/50/10 | Methanol | 10.5 (Ethanolamine) |

TABLE 4

| | After one polymerization run Amount of scale (g/m$^2$) | | After 10 polymerization runs Amount of scale (g/m$^2$) | |
|---|---|---|---|---|
| Exp. No | Liquid phase area | Area in vicinity of liquid - gas interface | Liquid phase area | Area in vicinity of liquid - gas interface |
| 201* | 300 | 650 | — | — |
| 202* | 240 | 640 | — | — |
| 203* | 280 | 650 | — | — |
| 204* | 280 | 650 | — | — |
| 205* | 230 | 520 | — | — |
| 206* | 270 | 630 | — | — |
| 207* | 150 | 180 | — | — |
| 208 | 0 | 3 | 15 | 23 |
| 209 | 0 | 1 | 0 | 1 |
| 210 | 0 | 2 | 10 | 5 |
| 211 | 0 | 0 | 30 | 16 |
| 212 | 0 | 1 | 0 | 1 |

We claim:

1. A polymer scale preventive agent for use in polymerization of a monomer having an ethylenic double bond, comprising:
   (A) a nitrogen-containing organic compound having at least five continuous conjugated π bonds and selected from the group consisting of nitrogen-containing naphthalene derivatives, nitrogen-containing heterocyclic compounds and nitrogen-containing azo compounds,
   (B) an anionic compound comprising at least one member selected from the group consisting of anionic heterocyclic compounds and anionic azo compounds and having at least one group selected from the group consisting of the sulfonic acid group and the carboxylic group and having at least five continuous conjugated π bonds, and
   (C) a vinylpyrrolidone-based polymer comprising at least one member selected from the group consisting of polyvinylpyrrolidones, vinylpyrrolidone-acrylic acid copolymers and vinylpyrrolidone-vinyl acetate copolymers with a molecular weight of 2,000 to 2,000,000.

2. The polymer scale preventive agent according to claim 1, wherein the amount of the component (B) is 0.1 to 1,000 parts by weight per 100 parts by weight of the component (A), and the amount of component (C) is 0.1 to 1,000 parts by weight per 100 parts by weight of the components (A) and (B) in total.

3. The polymer scale preventive agent according to claim 1, which further comprises a solvent in which the components (A), (B) and (C) is dissolved or dispersed to form a liquid state.

4. The polymer scale preventive agent according to claim 3, wherein the total concentration of the component (A), (B) and (C) is in the range of from 0.001 to 15% by weight.

5. The polymer scale preventive agent according to claim 3, wherein the solvent consists of an organic solvent and optionally 0 to 30% by weight of water.

6. The polymer scale preventive agent according to claim 5, wherein the water is contained in an amount of 0 to 10% by weight.

7. The polymer scale preventive agent according to claim 3, wherein the pH of the polymer scale agent is higher than 4.

8. The polymer scale preventive agent according to claim 7, wherein the pH is 7.5 or higher.

9. The polymer scale preventive agent according to claim 7, wherein the pH is 9.0 or higher.

10. The polymer scale preventive agent according to claim 7, wherein an organic amine compound is contained.